Figure 1:
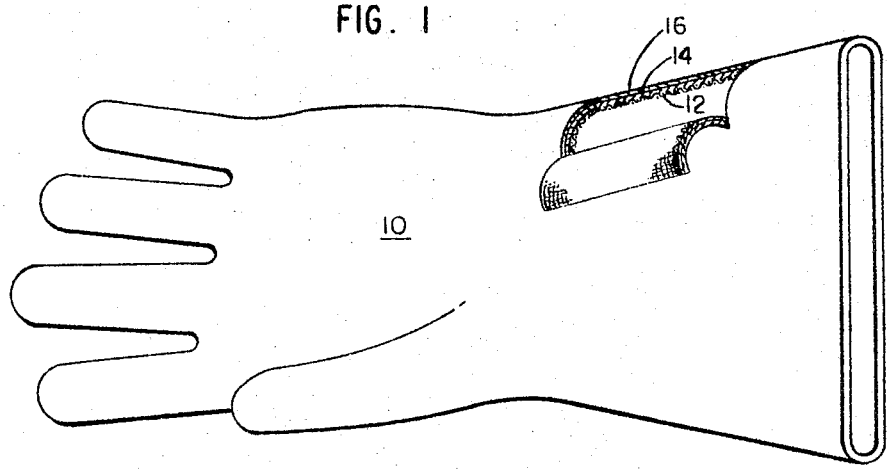

Aug. 23, 1966  E. A. BRODEUR, JR  3,268,355

METHOD OF PRODUCING VINYL COATED FABRIC GLOVE

Filed June 7, 1962

INVENTOR.
EDOUARD A. BRODEUR, JR.
BY Kenway, Jenney
  & Hildreth

ATTORNEYS 3,268,355
METHOD OF PRODUCING VINYL COATED
FABRIC GLOVE
Edouard A. Brodeur, Jr., Summerville, Ga., assignor to The Best Manufacturing Corporation, Menlo, Ga., a corporation of Georgia
Filed June 7, 1962, Ser. No. 200,696
1 Claim. (Cl. 117—76)

This invention relates generally to vinyl coated articles and the like and more specifically to an improved heavy-duty vinyl work glove and method for producing the same.

It is frequently desirable, if not mandatory, that suitable protective work gloves be used when handling various materials which may be harmful to the skin. The use of such work gloves has increased in recent years due to a growing awareness that safety work gloves are needed not only in a factory or manufacturing environment, but also in the home.

It has been common for some time to employ a cotton or other cloth glove for various gardening applications. This type of glove has, however, been found generally unsatisfactory where it is desired to protect the wearer's hand from harmful fluids or like substances which may impregnate the cloth glove thereby ultimately rendering it useless.

In order to overcome the difficulties encountered with cloth gloves, a plurality of latex work gloves have been provided. These gloves have served satisfactorily within the limitations imposed by their latex composition. More recently, it has been found that vinyl coated gloves are still more desirable since they may be used in many different environments without suffering deleterious effects.

In vinyl coated gloves heretofore available, a compromise was required between characteristics of flexibility and abrasion resistance. This compromise was necessitated by the fact that the characteristics of flexibility and abrasion resistance are essentially inversely related. That is, the softer the vinyl coating of the glove, the less abrasion resistance is achieved. Inversely, the more abrasion resistant the glove, the less flexible.

It is, therefore, an object of this invention to provide a method of manufacturing vinyl coated articles such as gloves and the like which method will produce an article having a maximum degree of flexibility combined with a maximum degree of abrasion resistance.

It is a further object of this invention to provide a method of producing vinyl coated articles in which plastisols having low viscosities are employed while at the same time producing an article having high abrasion resistance.

In the practice of my invention in a preferred embodiment thereof, I produce a vinyl coated work glove in the following fashion. A suitable fabric shell or liner is positioned on a form as is known in the art. The shell-covered form is then dipped into a first plastisol having a low viscosity and having characteristics making for good bonding with the fabric shell and the production of a substantially flexible layer of vinyl thereon. After a brief fusing of the first plastisol, the form is dipped into a second plastisol. The second plastisol has characteristics of abrasion resistance and also has a low viscosity. The plastisols are then cured in the usual fashion whereupon the finished article is stripped from the form. A work glove is thus produced having an inner fabric shell, a first layer of flexible vinyl properly joined to the flexible shell, and a second layer of abrasion-resistant vinyl properly bonded to the first flexible layer of vinyl.

It is a feature of my invention that the second, or abrasion-resistant, layer of vinyl fuses to a hard veneer coat and does not come into contact with the shell fabric in any way.

It is a further feature of my invention that the plastisols employed in the first and second dip are initially compounded to provide characteristics of high flexibility and controlled fabric penetration, and high abrasion resistance respectively.

Figure 2:
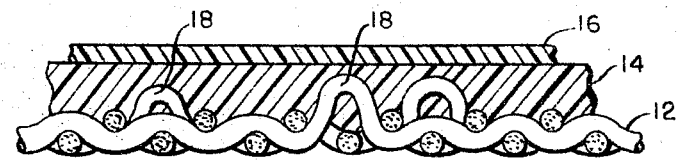

These and other objects and features of my invention will appear as the description proceeds with the aid of the accompanying drawings, in which:

FIG. 1 is a view of a glove produced according to my invention looking toward the palm thereof; and FIG. 2 is a section taken through a portion of a glove similar to the glove of FIG. 1.

Referring now to FIGS. 1 and 2 for a more particular description of my invention in a preferred embodiment thereof, a work glove indicated generally at 10 is shown having an inner fabric shell or liner 12. Bonded to the shell 12 is a continuous inner vinyl layer 14 which is produced from a first vinyl plastisol having characteristics of high flexibility and fabric impregnation. A continuous outer vinyl layer 16 is integrally bonded to the inner layer 14. The outer layer 16 is produced from a second vinyl plastisol having characteristics of high abrasion resistance.

As is more clearly shown in FIG. 2, the fabric shell 12 may be provided with a plurality of fibers or loops 18 to assist bonding of the inner vinyl layer 14 thereto.

The nature and characteristics of the work glove above described will, it is believed, be most apparent from a description of the method by which it is produced, an example of which follows:

A fabric shell, or liner, is first placed on a suitable form. The shell may be of any usual type commonly employed in forming gloves. The mold may likewise be of any usual type. In the preferred embodiment the mold is constructed of polished aluminum, although it will be understood that a ceramic, wooden or similar mold may be substituted therefor.

Following application of the fabric shell to the mold, an optional step of shell treatment is provided. It is frequently desirable to treat the fabric shell to reduce surface lint and if this step is desired any usual method may be used, as for example singeing with a flame. Alternatively, a sizing technique such as dipping the fabric shell in a bath of diluted vinyl latices may be employed.

After the fabric shell has been applied to the mold, and following the step of shell treatment if desired, the shell is dipped in a first plastisol which is compounded initially to provide a soft flexible vinyl undercoat for the glove. A sample recipe for the first plastisol would be as follows:

| Ingredients: | Parts |
|---|---|
| Vinyl resin, preferably of the softer copolymer type | 80 |
| Vinyl blending resin of the large particle type | 20 |
| Low migrating primary plasticizer | 60 |
| Primary phthalate ester plasticizer such as diisooctyl phthalate | 40 |
| Epoxy secondary | 20 |
| Heat stabilizer | 2 |

This recipe is considered to be typical, and it will be understood that many variations are possible within the framework thereof which will produce the same result. It will be noted that it is desired to compound a plastisol which will have a relatively low viscosity and which will produce a soft flexible layer on the fabric shell. In this regard, low molecular weight 100% vinyls will produce a soft plastisol, or additional plasticizer may be added to harder resins.

The combination of the large particle size blending resin in the range of 15 to 30 parts with the low viscosity of the plastisol outlined above will produce a saturation of surface fibers of the fabric shell providing mechanical blocking of the fabric interstices. This will establish simultaneously maximum adhesion qualities and maximum flexibility. In order to obtain a soft film having a thin viscosity it has been observed that a plasticizer level of 100 to 130 parts mixed with 100 parts of resin produces a satisfactory plastisol. The selection of low migrating plasticizers minimizes the possibility of migration of plasticizer from layer to layer.

Following the first dip, the mold is removed from the plastisol and any excess plastisol is allowed to drain from the mold. Drain time may be eliminated, as is customary, by the use of plastigel type systems, if desired.

Following the draining step, the mold is inverted to smooth out any drips remaining on the mold before setting the film. In the present invention the setting step is critical since the article will subsequently be subjected to a second dip. The gel must be of sufficient character to set the plastisol to a soft film that will not flow into the next succeeding dip, yet will not be hard enough to prevent adequate ply adhesion. In the practice of my invention this gel is achieved by subjecting the article to a temperature varying between 500° and 600° F. for a period of about 10 seconds. It should further be noted that by subjecting the article to a high temperature for but a short period of time a surface gel is produced without heating the mold itself to temperatures sufficiently high that a long cooling period is required before the next dip.

Following the inversion of the mold and the gelling of the first layer, the mold is cooled at room temperature for approximately 5 minutes. It will be understood that longer gels at lower temperatures with correspondingly longer, or forced, cooling will accomplish the same result.

When the mold has cooled sufficiently so that the surface temperature is less than about 130° F., the second abrasive-resistant layer of vinyl is applied. The mold is dipped into a second plastisol which is initially compounded to have characteristics of abrasion resistance and hardness. As it is desired to obtain a reasonably low dipping viscosity with plastisol levels of 30 to 50 parts per 100 of resin, as required for hardness, I incorporate a polymerizable polyester plasticizer that converts from a thin liquid at room temperature to a hard solid at fusing temperatures. This result may also be accomplished with volatile diluents, but with a resulting process complication in the form of added drying cycles and viscosity control problems. A sample recipe for the second dip is as follows:

Ingredients: Parts
   High molecular weight straight polyvinyl-chloride resin _____ 100
   Primary plasticizer of the phthalate type such as diisooctyl phthalate _____ 60
   Polymerizerable resin plasticizer _____ 40
   Heat stabilizer _____ 2

It will be understood that other primary plasticizers and resins may be substituted in the above recipe while still producing a hard surface plastisol. High molecular weight straight polyvinyl-chloride resins are generally employed because of their ability to deliver a maximum hardness at a given plasticizer level.

Following the second dip the mold is removed from the plastisol, drained and inverted in substantially the same fashion as after the first dip outlined above.

Once the mold has been inverted following the second dip, the fusing of the second plastisol must be accomplished. It is highly desirable that this fusing take place relatively slowly and at a moderate temperature in order to minimize migration of the plasticizers from the first layer into the second layer while still insuring a thorough, uniform fusing. It has been observed that where a cotton shell is employed and the dip recipes are substantially those outlined above, a fusing period of 25 to 35 minutes at 340° to 360° F. is preferred.

Once the final fusing is accomplished, the mold is cooled and the glove is removed therefrom in any usual fashion.

It will be observed that a glove is produced comprising a fabric shell, a first layer of vinyl compounded for characteristics of good adhesion to the fabric shell and maximum flexibility, and a second layer of vinyl compounded for characteristics of hardness and abrasion resistance.

It is a feature of this invention that each of the dips is free of the limiting factors of the other. In this fashion it is possible to produce a vinyl coated article which satisfactorily combines the desired above-mentioned properties.

It will be understood that whereas the process above described has been disclosed in conjunction with a mold for making work gloves, the invention is not limited to such gloves but is broadly applicable to any situation in which it is desired to produce an article with a vinyl covering and in which flexibility and abrasion resistance are both desired. To name but two examples, vinyl footwear having a tough outer sole and a flexible insole could be provided by my process, as could vinyl coated wire racks such as those commonly used in dishwashing applications.

It is my intention to claim all changes and modifications of the example of my invention herein given for purposes of disclosure which do not constitute departures from the spirit and scope of the invention.

What I claim as new and desire to secure by Letters Patent of the United States is:

The method of producing a vinyl coated fabric glove comprising the steps of:
   mounting a fabric shell on a glove form for successive dips in a plurality of vinyl plastisols;
   dipping the shell in a first plastisol to produce a saturation of the surface fibers of the shell and to provide mechanical blocking of the shell interstices, the first plastisol being formulated to produce a relatively soft and flexible composition when cured;
   removing the shell from the first plastisol;
   draining any excess first plastisol from the shell;
   partially fusing the first plastisol to the gelled state at a temperature of about 500 to 600° F. for a time sufficiently short to produce a nonflowing gel without curing;
   cooling the shell;
   dipping the shell into a second vinyl plastisol formulated to produce, when cured, a composition which is relatively hard and abrasion resistant compared to the composition formed from the first plastisol;
   removing the shell from the second plastisol;
   draining any excess second plastisol from the shell;
   fusing the first and second plastisols at a temperature substantially lower than the temperature to which the first plastisol is subjected in the gelling step, sufficient to obtain a uniform curing of the first and second plastisols with a minimum of plasticizer migration from the flexible first plastisol into the harder second plastisol;
   cooling the shell; and
   removing the vinyl coated fabric from the positioning form.

References Cited by the Examiner
UNITED STATES PATENTS
2,431,745   12/1947   Flanagan _____ 117—161
2,792,321   5/1957   Fredericks.
3,065,096   11/1962   Marsden et al. _____ 117—10

ALEXANDER WYMAN, *Primary Examiner.*

EARL M. BERGERT, *Examiner.*

L. T. PIRKEY, *Assistant Examiner.*